(12) United States Patent
Lange

(10) Patent No.: US 6,402,250 B1
(45) Date of Patent: Jun. 11, 2002

(54) DEVICE FOR LOCKING A BACKREST THAT CAN BE FOLDED

(75) Inventor: Dieter Lange, Petershagen (DE)

(73) Assignee: Bertrand Faure Siztechnik GmbH & Co. KG, Stadthagen (DE)

( * ) Notice: Subject to any disclaimer, the term of this patent is extended or adjusted under 35 U.S.C. 154(b) by 0 days.

(21) Appl. No.: 09/534,988

(22) Filed: Mar. 27, 2000

(30) Foreign Application Priority Data

Apr. 8, 1999 (DE) .......................................... 199 15 780

(51) Int. Cl.$^7$ ................................................ B60N 2/20
(52) U.S. Cl. ................................................ 297/378.12
(58) Field of Search ...................... 297/378.12, 378.14, 297/378.1

(56) References Cited

U.S. PATENT DOCUMENTS

| | | | | |
|---|---|---|---|---|
| 4,103,964 A | * | 8/1978 | Klingelhofer et al. | 297/378.12 X |
| 4,995,669 A | * | 2/1991 | Croft | 297/378.12 |
| 5,224,759 A | * | 7/1993 | Matsura et al. | 297/378.12 X |
| 5,383,710 A | * | 1/1995 | Premji | 297/378.12 |
| 5,414,897 A | | 5/1995 | Loewe | |
| 5,707,111 A | * | 1/1998 | Kim | 297/378.12 |
| 5,800,017 A | * | 9/1998 | Sylvain et al. | 297/378.12 X |
| 5,938,286 A | * | 8/1999 | Jones et al. | 297/378.12 |

FOREIGN PATENT DOCUMENTS

DE        2 139 357        2/1973

* cited by examiner

Primary Examiner—Peter M. Cuomo
Assistant Examiner—Rodney B. White
(74) Attorney, Agent, or Firm—Connolly Bove Lodge & Hutz LLP

(57) ABSTRACT

An apparatus for locking a backrest which is moveable between a folded and an upright position relative to a seat portion is provided. The apparatus comprises a first flanged area attached to the seat portion. A second flanged area is attached to the backrest and is seated on the first flanged area such that the second flanged area is pivotable about a folding axis. A locking latch, articulated on the second flanged area, is moveable between a locked and an unlocked position. In the locked position, a locking surface of the locking latch communicates with an opposing surface on the first flanged area to hold the backrest in place and in the unlocked position the locking surface is disengaged from the opposing surface such that the second flanged area may be pivoted about the folding axis. The pivoting of the second flanged area is limited by a contact surface attached to the backrest and an opposing contact surface on the first flanged area. A handle is provided to move the locking latch between its locked and unlocked positions about a pivot axis which is parallel to the folding axis. A spring element is arranged to move the locking latch about the folding axis when the locking latch is moved into the unlocked position and a readjusting spring biases the locking latch into its locked position.

10 Claims, 5 Drawing Sheets

DEVICE FOR LOCKING A BACKREST THAT CAN BE FOLDED

BACKGROUND OF THE INVENTION

The invention pertains to a device for locking a backrest. The backrest can be folded over a seat portion to allow access to an area behind the backrest.

In known devices of this kind, for example, (DE 196 54 433 C1), using both hands, the backrest is lifted slightly when the locking latches, which are provided at either side of the seat, are disengaged, so that the locking latch cannot fall back into its locking position. Thereafter, in a procedure separate from the unlocking process, the backrest can be folded forward. A protrusion is provided to hold the locking latch in its unlocked position. The protrusion comes to rest, as the latch is pivoted, against a shoulder of the adjustment fitting, which is firmly attached to the seat. The protrusion is held by the weight of the backrest in this position. Due to the fact that wear, which can lead to slippage of the protrusion from the shoulder, can occur between the protrusion and the shoulder, reliable operation of the locking latch decreases with age.

In the case of the known solution, the locking surface and the opposing surface must be configured in wedge-shaped fashion in order to assure that the locking catch falls into place into the corresponding recess on the portion of the fitting that is firmly attached to the seat, and furthermore to assure a lock that is rattle-free. The wedge-shape of these interacting surfaces does have the disadvantage, however, that in certain crash situations, the catch can be moved out of its locking position.

Taking this state of the art as a point of departure, it is the underlying task of the invention to create a device for the locking of a backrest that can be folded and is held rattle-free, and that is not released in the event of a crash.

SUMMARY OF THE INVENTION

An apparatus for locking a backrest which is moveable between a folded and an upright position relative to a seat portion is provided. The apparatus comprises a first flanged area attached to the seat portion. A second flanged area is attached to the backrest and is seated on the first flanged area such that the second flanged area is pivotable about a folding axis. A locking latch, articulated on the second flanged area, is moveable between a locked and an unlocked position. In the locked position, a locking surface of the locking latch communicates with an opposing surface on the first flanged area to hold the backrest in place and in the unlocked position the locking surface is disengaged from the opposing surface such that the second flanged area may be pivoted about the folding axis. The pivoting of the second flanged area is limited by a contact surface attached to the backrest and an opposing contact surface on the first flanged area. A handle is provided to move the locking latch between its locked and unlocked positions about a pivot axis which is parallel to the folding axis. A spring element is arranged to move the locking latch about the folding axis when the locking latch is moved into the unlocked position and a readjusting spring biases the locking latch into its locked position.

As a result of a spring propulsion system, which folds the backrest forward, comfort is enhanced to a considerable degree. Due to pre-tensioning from the spring, the backrest of the unoccupied motor vehicle seat is held in place rattle-free. In addition, the locking surfaces, which are free of gradient, exhibit no components of force which would drive the latch from its locking position, so that the closure cannot be released, not even under extreme stress.

A particularly preferred embodiment of the invention includes an additional cam, by means of whose contact surface, which runs eccentric to its axis of pivot, freedom from rattling is further improved. The cam can be moved by the re-adjusting spring of the locking latch. In addition, by means of this cam, the locking latch's angle of pivot can be limited.

BRIEF DESCRIPTION OF THE DRAWINGS

In what follows, a preferred embodiment form of the invention is described in detail by virtue of the drawings.

DETAILED DESCRIPTION OF THE INVENTION

Figure 1:
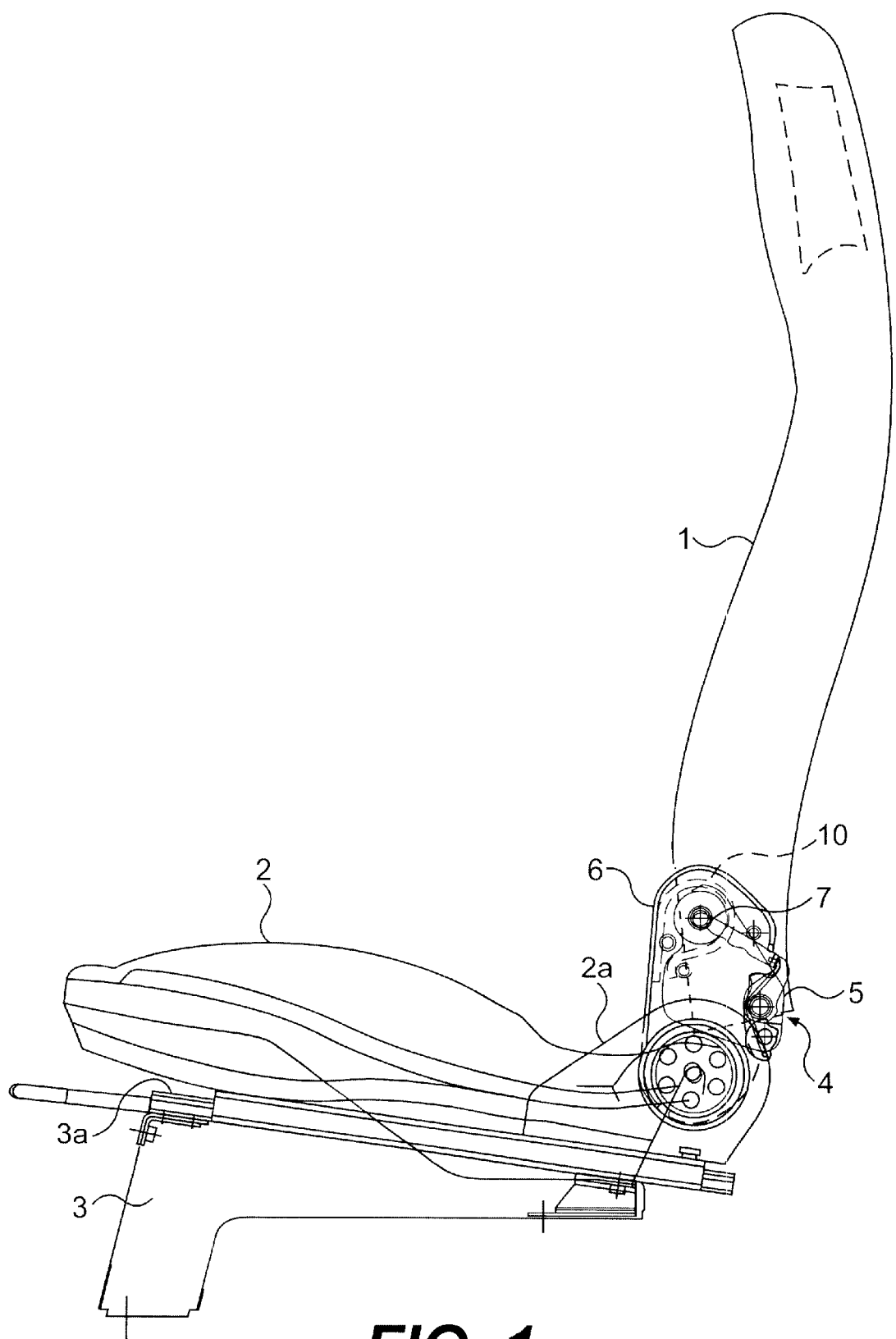
FIG. 1 shows a side view of a motor vehicle seat with a backrest that may be folded forward, in the in-use position.
Figure 2:
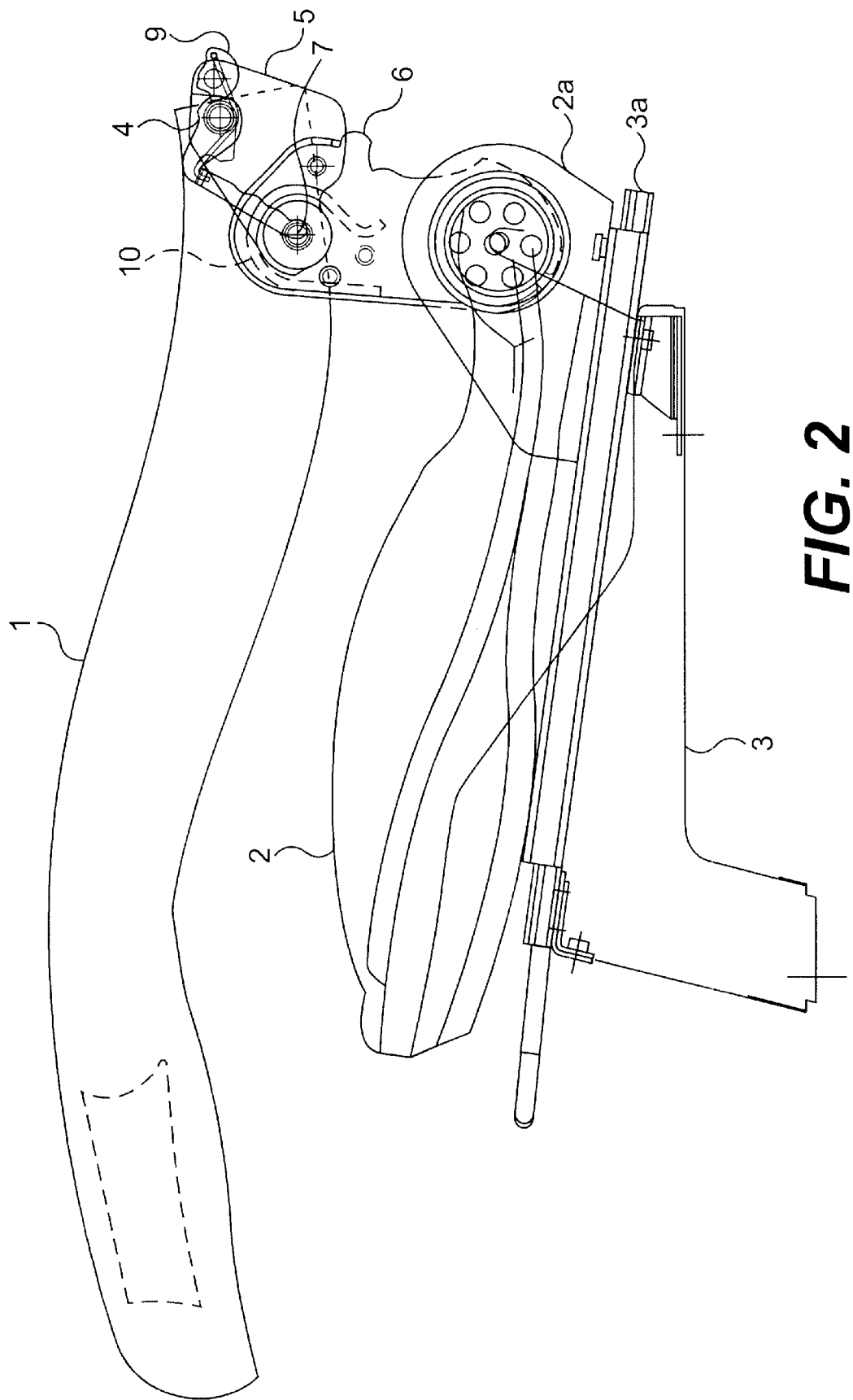
FIG. 2 shows the side view of the motor vehicle seat according to FIG. 1, with the backrest folded forward.
Figure 3:
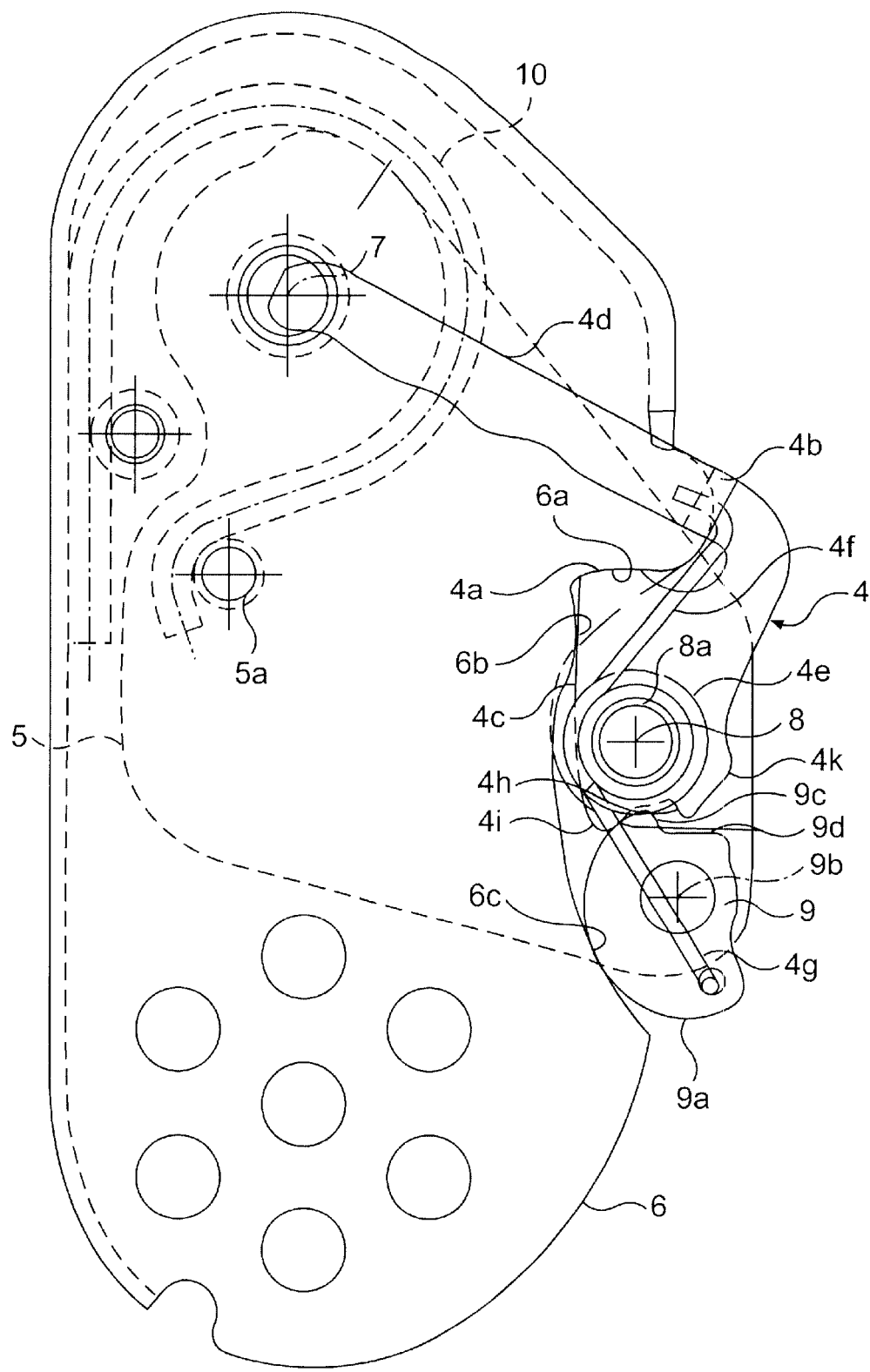
FIG. 3 shows a schematic representation of the locking device of the motor vehicle seat according to FIG. 1, in side view.

Referring to FIG. 1, a motor vehicle seat having a seat portion 2 and a backrest 1 that may be folded opposite the seat portion 2 is provided. The seat portion is attached to a console 3 in such a way that its position may be shifted longitudinally by means of seat tracks 3*a*. Between backrest 1 and seat portion 2, an inclination adjustment fitting 2*a* is provided, with which the inclination of the backrest 1 can be changed. On either side of the motor vehicle seat, fittings having, in each case, a flanged area 6 that is firmly attached to the seat portion, are provided, on which a second flanged area 5 which is firmly attached to the backrest, is seated on the first flanged area 6 so as to be capable of pivoting around a folding axis 7. The folding axis 7 is arranged relatively high above the seat portion 2 so that the backrest 1 can pivot into a horizontal position as is shown in FIG. 2.

The second flanged area 5 which is firmly attached to the backrest, is locked across from the flanged area 6, which is firmly attached to the seat, by means of a locking latch 4. When the locking latch 4 pivots out of its initial position, which is depicted in FIG. 1, into a release position, the backrest 1 is folded forwards by means of spring 10, which is preferably embodied as a leg spring. After an initial angle of pivot of the backrest 1, which is caused by the force of the spring 10, further pivotal motion of the backrest into the horizontal position depicted in FIG. 2 is accomplished as a result of the inherent weight of backrest 1.

The spring 10 is firmly secured with one leg to the flanged area 6, which is firmly attached to the seat portion, whilst the other leg grips a mandrel 5*a* on second flanged area 5, which is firmly attached to the backrest, from behind. The locking latch 4 is seated at second flanged area 5 in such a way as to be capable of pivoting around an axis of pivot 8 that is parallel to the folding axis 7. The locking latch 4 works together with cam 9, which is also seated so as to be capable of pivoting at the second flanged area 5, which is firmly attached to the backrest. A readjusting spring 4*e*, one leg of which 4g slews the cam 9 around the axis of pivot 9b, is supported on a bearing bolt 8a, which is the seat for the locking latch 4. The other leg 4f of readjusting spring 4e holds locking latch 4 in its initial position.

In the initial position, a locking surface 4a of locking latch 4 rests against an opposing surface 6a of the flanged area 6, which is firmly attached to the seat portion. The locking surface 4a and the opposing surface 6a are preferably curved, and they should describe a circular arc around the axis of pivot 8. The locking surface 4a and the opposing surface 6a are held by the spring 10 in such a way as to lie against each other. In its initial position, the locking latch 4, with a locking latch area 4c, which is adjacent to locking surface 4a, abuts a stop 6b on the flanged area 6, which is firmly attached to the seat portion. Locking latch 4 is held in this contact position by means of the re-adjusting spring 4e.

The cam 9 is turned so far around its axis of pivot 9b in clockwise fashion by the re-adjusting spring 4e that a contact surface 9a, which runs eccentric to the axis of pivot 9b, lies against the opposing contact surface 6c. The cam 9 is reset so long as there is still play between the flanged area 6, which is firmly attached to the seat portion, and second flanged area 5, which is firmly attached to the backrest.

Figure 4:
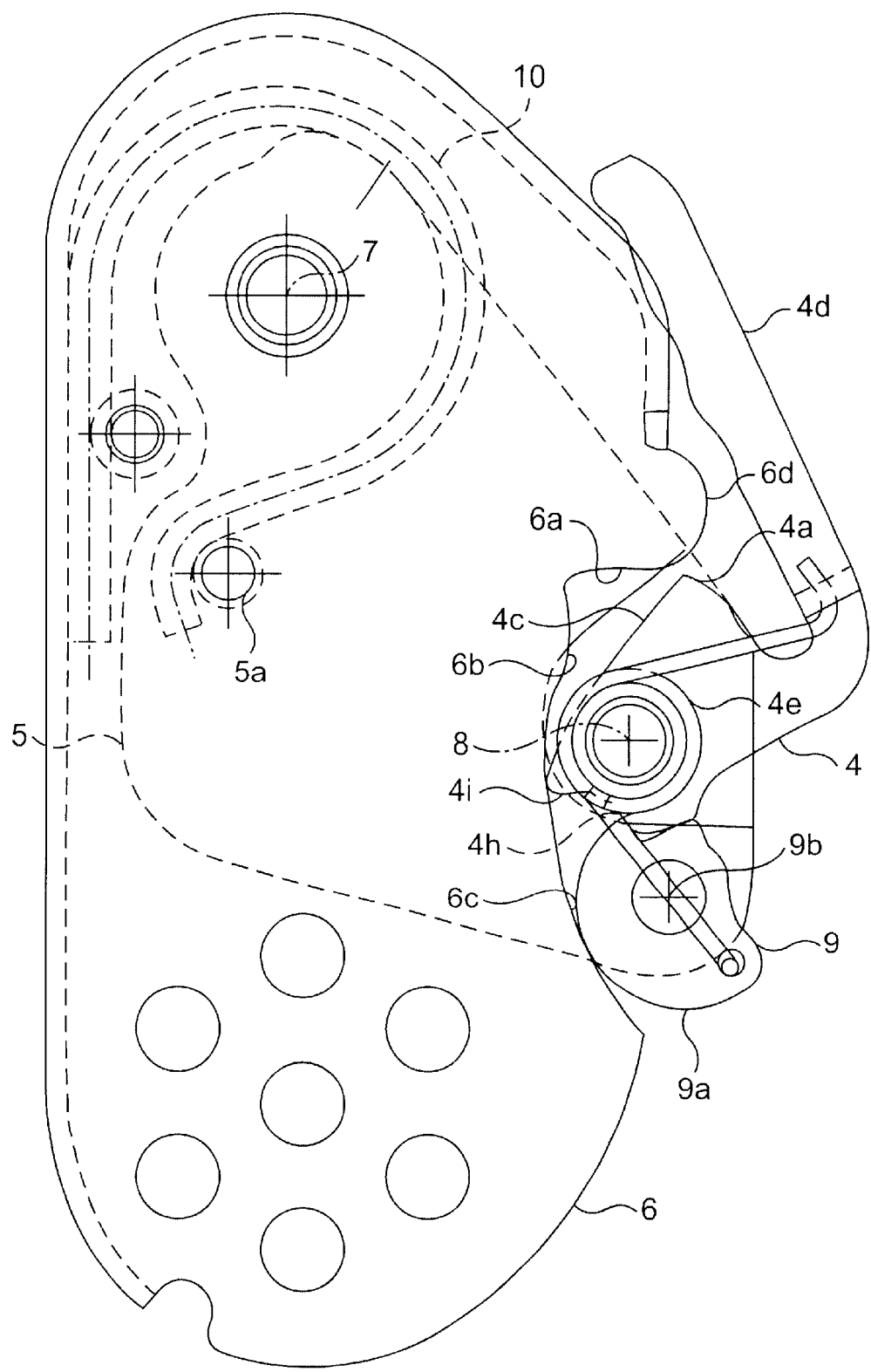
FIG. 4 shows the side view of the locking device according to FIG. 3, with a locking latch that has been pivoted from the initial position.

The locking latch 4 is preferably embodied as a single piece with an activation handle 4d. A flange 4b is provided on the locking latch 4, to which the leg 4f of re-adjusting spring 4e is attached. For unlocking, locking latch 4 is pivoted in clockwise fashion, as shown in the drawings, by the activation handle 4d against the force of the re-adjusting spring 4e into the position depicted in FIG. 4. In this position, the locking surface 4a is released from the opposing surface 6a. Now, backrest 1 can be folded forwards by the spring 10. While locking latch 4 is being pivoted, an initial catch 4h is laid against a protrusion 9c of the cam 9 and turns the latter in the opposite direction from the direction in which the re-adjusting spring 4e works. The contact surface 9a is, as a result, lifted from the opposing contact surface 6c so that any pre-tension that might be present between flanged area 6, which is firmly attached to the portion of the seat, and second flanged area 5, which is firmly attached to the backrest, is suspended.

Figure 5:
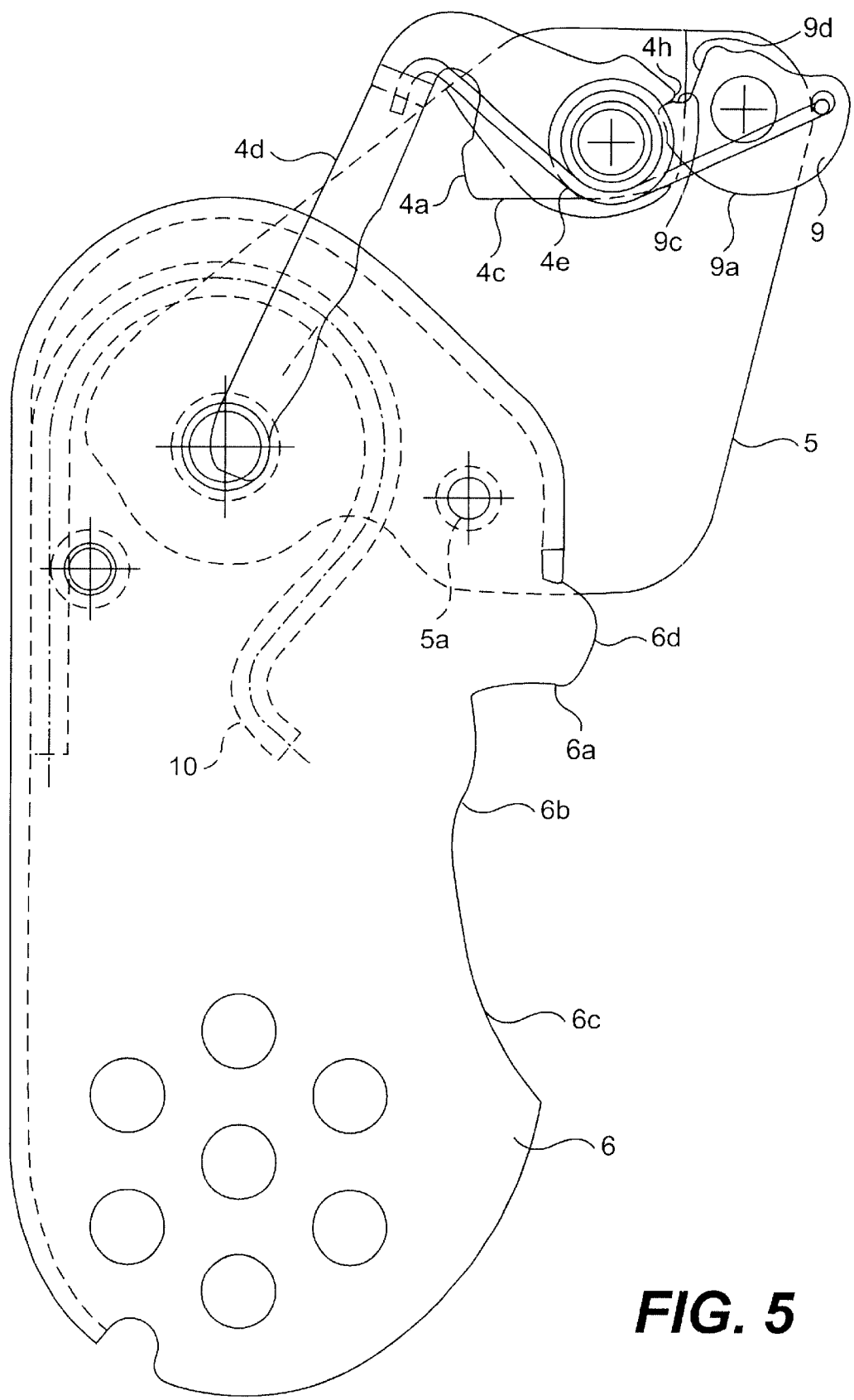
FIG. 5 shows the side view of the locking device according to FIG. 3 with the backrest folded forward, according to FIG. 2.

The locking latch 4 can be pivoted by the activation handle 4d only until an opposing surface 4k abuts a locking surface 9d. After the forward folding of backrest 1 has been started, the activation handle 4d can be released. The locking latch 4 is pivoted back by the readjusting spring 4e, as can be seen from FIG. 5, beyond the initial position, until a second catch 4i of the locking latch 4 rests against an opposing surface of the cam 9. The mandrel 5a is lifted up by the spring 10 due to the fact that the backrest 1 has terminated the folding movement as a result of its gravity.

In righting the backrest 1, the locking latch area 4c encounters a projection 6d of the flanged area 6, which is firmly attached to the seat portion, and is pivoted back in the unlocking direction until such time as the locking surface 4a can glide underneath the opposing surface 6a. This does not occur until the backrest has attained its in-use position. The catch 4h, which abuts protrusion 9c, moves the cam 9 in a counterclockwise fashion in the course of the pivoting motion of the locking latch 4 so that an area of the contact surface 9a comes to rest against the opposing contact surface 6c at a slight distance from the axis of pivot 9b. Just shortly before locking latch 4 has attained its initial position once more, that is, its locking latch area 4c lies against stop 6b, the cam 9 is released by the stop 4h and can be twisted by the leg 4g of the re-adjustment spring 4e. Any play that is present between the elements of the locking device is eliminated by the eccentric contact surface 9a.

It should be understood that the invention is not limited to the exact details of construction shown and described herein for obvious modifications will occur to persons skilled in the art.

What is claimed is:

1. Apparatus for locking a backrest which is moveable between a folded and an upright position relative to a seat portion, the apparatus comprising:

a first flanged area attached to the seat portion;

a second flanged area attached to the backrest and seated on the first flanged area such that the second flanged area is pivotable about a folding axis;

a locking latch articulated on the second flanged area and moveable between a locked and an unlocked position, in the locked position a locking surface of the locking latch communicates with an opposing surface on the first flanged area to hold the backrest in place and in the unlocked position the locking surface is disengaged from the opposing surface such that the second flanged area may be pivoted about the folding axis, the pivoting of the second flanged area being limited by a contact surface attached to the second flange area and a second opposing contact surface on the locking latch;

a handle is provided to move the locking latch between its locked and unlocked positions about a pivot axis which is parallel to the folding axis;

a spring element arranged to move the locking latch about the folding axis when the locking latch is moved into the unlocked position; and a re-adjusting spring biasing the locking latch into its locked position.

2. The apparatus according to claim 1, wherein a locking latch area is provided on the locking latch adjacent to the locking surface, the locking latch area engages a stop on the first flanged area to limit the locked position, the locking latch area being biased against the stop by the re-adjusting spring.

3. The apparatus according to claim 1, wherein the spring element is a leg spring.

4. The apparatus according to claim 1, wherein the contact surface is curved and is arranged on a cam, the cam being seated on the second flanged area to be pivoted about an axis, the contact surface running eccentric to the axis.

5. The apparatus according to claim 4, wherein a spring biases the cam in a direction of increasing eccentricity of the contact surface.

6. The apparatus according to claim 4, wherein the re-adjusting spring is a leg spring, one leg of which biases the locking latch in the locked position and another leg of which biases the cam.

7. The apparatus according to claim 5, wherein the cam comprises a projection, the projection engaging an initial stop on the locking latch when the locking latch is moved to its unlocked position such that the cam is pivoted against the force of the spring.

8. The apparatus of claim 5, wherein a locking surface is provided on the cam, the locking surface engages the second opposing contact surface on the locking latch to limit the rotation of the locking latch about the pivot axis.

9. The apparatus according to claim 4, further comprising a second stop provided on the locking latch, the second stop engages a surface of the cam after the locking latch passes the locking position, the locking latch is biased by the readjusting spring beyond the locking position when the backrest is folded forward.

10. The apparatus according to claim 1, wherein the backrest may be pivoted into a substantially horizontal position.

* * * * *